US009712206B2

(12) United States Patent
Nemeth et al.

(10) Patent No.: US 9,712,206 B2
(45) Date of Patent: Jul. 18, 2017

(54) PREAMBLE DESIGN AND PROCESSING METHOD FOR ON-THE-FLY, FRAME-BY-FRAME AIR DATA RATE DETECTION IN WIRELESS RECEIVERS

(75) Inventors: József G. Nemeth, Budapest (HU); Péter Szilveszter Kovács, Santa Clara, CA (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 335 days.

(21) Appl. No.: 13/330,968

(22) Filed: Dec. 20, 2011

(65) Prior Publication Data
US 2012/0163480 A1  Jun. 28, 2012

Related U.S. Application Data

(60) Provisional application No. 61/427,265, filed on Dec. 27, 2010.

(51) Int. Cl.
*H04B 7/216* (2006.01)
*H04B 1/00* (2006.01)
*H04B 1/707* (2011.01)

(52) U.S. Cl.
CPC .............. *H04B 1/707* (2013.01); *H04B 1/00* (2013.01); *H04B 7/216* (2013.01); *H04B 2201/70705* (2013.01)

(58) Field of Classification Search
CPC .......... H04B 1/707; H04B 7/216; H04B 1/00; H04B 2201/70705; H04J 3/24
USPC ....... 370/278, 338, 347, 515, 485, 352, 323, 370/337, 260, 332, 252, 392, 474, 328; 375/147, 260; 455/226, 67.11
See application file for complete search history.

(56) References Cited

U.S. PATENT DOCUMENTS

| 6,078,576 | A | * | 6/2000 | Schilling et al. | 370/347 |
| 6,437,710 | B1 | * | 8/2002 | Tam et al. | 341/58 |
| 6,985,514 | B2 | * | 1/2006 | Zalio et al. | 375/147 |
| 7,031,741 | B2 | * | 4/2006 | Lee et al. | 455/522 |

(Continued)

FOREIGN PATENT DOCUMENTS

| EP | 1178630 A1 | 2/2002 | H04L 12/28 |
| WO | WO 2008036413 A1 * | 3/2008 | H04L 7/041 |

OTHER PUBLICATIONS

Park, "IEEE P802.15 Wireless Personal Area Networks", Jan. 2010, p. 1-19.*

(Continued)

*Primary Examiner* — Alpus H Hsu
*Assistant Examiner* — Camquyen Thai
(74) *Attorney, Agent, or Firm* — Slayden Grubert Beard PLLC

(57) ABSTRACT

In a system and method for wireless communication with a transmitter and a receiver, the transmitter is operable to wirelessly transmit digital information to the receiver with a plurality of data transmission rates using a modulation format, wherein the digital information is transmitted using a transmission frame including a header part and a payload part, and the header part comprises a preamble, wherein the modulation format is the same for all data transmission rates and wherein the data transmission rate is at least encoded into the preamble of the frame, and wherein the receiver is configured to determine the data transmission rate when receiving the preamble.

29 Claims, 10 Drawing Sheets

(56) References Cited

U.S. PATENT DOCUMENTS

| | | | |
|---|---|---|---|
| 7,180,963 B2* | 2/2007 | Wang et al. | 375/324 |
| 7,254,160 B2* | 8/2007 | Kawamoto et al. | 375/148 |
| 7,421,248 B1* | 9/2008 | Laux et al. | 455/67.11 |
| 7,983,235 B2* | 7/2011 | Powell et al. | 370/338 |
| 7,990,937 B2* | 8/2011 | Chang et al. | 370/338 |
| 8,358,639 B2* | 1/2013 | Black et al. | 370/338 |
| 8,614,961 B1* | 12/2013 | Katar et al. | 370/252 |
| 2002/0021692 A1* | 2/2002 | Huh et al. | 370/352 |
| 2004/0082356 A1* | 4/2004 | Walton et al. | 455/522 |
| 2004/0170120 A1* | 9/2004 | Reunamaki et al. | 370/204 |
| 2005/0152404 A1* | 7/2005 | Holmquist et al. | 370/485 |
| 2005/0226173 A1* | 10/2005 | Strawczynski et al. | 370/278 |
| 2007/0064646 A1* | 3/2007 | Esteves et al. | 370/329 |
| 2008/0240167 A1* | 10/2008 | Ivonnet et al. | 370/515 |
| 2009/0102687 A1 | 4/2009 | Furman et al. | 341/106 |
| 2010/0172394 A1 | 7/2010 | Lim et al. | 375/146 |
| 2010/0220774 A1* | 9/2010 | Park et al. | 375/222 |
| 2010/0309959 A1 | 12/2010 | Lakkis et al. | 375/150 |
| 2011/0064161 A1* | 3/2011 | Lim et al. | 375/295 |
| 2011/0130108 A1* | 6/2011 | Katayama et al. | 455/226.1 |
| 2011/0188516 A1* | 8/2011 | Borleske | H04J 3/24 |
| | | | 370/474 |

OTHER PUBLICATIONS

Texas Instrument, ADS1675—"4MSPS, 24-Bit Analog-to-Digital Converter"—ADS1675, Aug. 2010, p. 1-37.*

International PCT Search Report and Written Opinion, PCT/US2011/066528, 13 pages, Mar. 29, 2012.

Miller, Mark, et al., "An Innovative Synchronization Preamble for UHF MILSATCOM", IEEE Military Communications, Conference Proceedings, IEEE Piscataway, NJ, USA; vol. 2, pp. 1338-1342, Oct. 31, 1999.

Ramachandran, Iyappan, et al., "Clear Channel Assessment in Energy-Contrained Wideband Wireless Networks", IEEE Wireless Communications, vol. 14, No. 3; pp. 70-78, Jun. 1, 2007.

Chinese Office Action, Application No. 201180065520.5, 23 pages, Aug. 20, 2014.

* cited by examiner

![Figure 5 table of 16-bit DSSS16 chip sequences]
16-bit DSSS16 chip sequences
Figure 5
Low payload air data rate
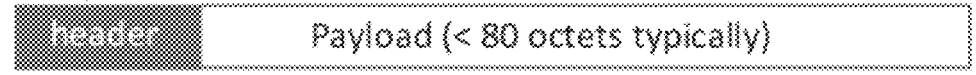
High payload air data rate
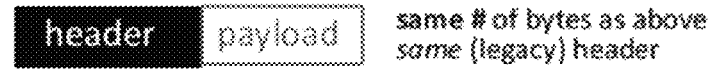 same # of bytes as above
*same (legacy) header*
Optimal header format
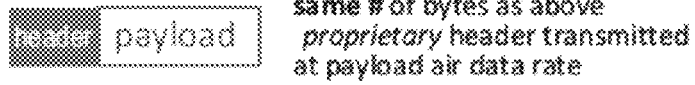 same # of bytes as above
*proprietary* header transmitted
at payload air data rate
*Mixing different air data rates involves mixing different headers!*
Figure 3

Preamble & SFD Formats

Proprietary 2Mbps frame

| Field: | Preamble | SFD |
|---|---|---|
| MSK pattern*: | 11110000 repeated 8 times | pattern_2000 : fully configurable |
| Duration: | 32 μs (64 chips) | 8 μs (16 chips) |

Proprietary 1Mbps frame

| Field: | Preamble | SFD |
|---|---|---|
| MSK pattern*: | 11110000 repeated 8 times | pattern_1000 : fully configurable |
| Duration: | 32 μs (64 chips) | 8 μs (16 chips) |

Proprietary 500kbps frame

| Field: | Preamble | SFD |
|---|---|---|
| MSK pattern*: | 1100101101101000 repeated 8 times | pattern_500: 2 configurable selected DSSS16 chip sequences |
| Duration: | 64 μs (128 chips) | 16 μs (32 chips) |

Standard 250kbps frame

| Field: | Preamble | SFD |
|---|---|---|
| MSK pattern*: | 11100000 01110111 10101110 01101100 repeated 8 times | pattern_250**: concatenation of the DSSS symbols defined by rows #7 and #10 in Figure 5 |
| Duration: | 128 μs (256 chips) | 32 μs (64 chips) |

Proprietary 125kbps frame

| Field: | Preamble | SFD |
|---|---|---|
| MSK pattern*: | 11100000 01110111 10101110 01101100 repeated 16 times | pattern_125: 4 configurable selected DSSS32 chip sequences |
| Duration: | 256 μs (512 chips) | 64 μs (128 chips) |

\* LEFT-MOST CHIP IS TRANSMITTED FIRST
\*\* GENERATES THE CHIP SEQUENCE: 10000111 01111010 11100110 11001110 10010011 00011111 10001000 01010001

*Figure 6*

| FRAME FORMATS | T us/byte | DURATION expressed in payload byte time [ T ] | | | |
|---|---|---|---|---|---|
| | | Preamble | SFD | Length | PHY payload |
| Proprietary 125kbps | 64 | 4 | 1 | 1 | N |
| Standard 250kbps | 32 | 4 | 1 | 1 | N |
| Proprietary 500kbps | 16 | 4 | 1 | 1 | N |
| Proprietary 1Mbps | 8 | 4 | 1 | 1 | N |
| Proprietary 2Mbps | 4 | 8 | 2 | 1 | N |

$P_1$ = 11110000   $SFD_{11}$ = pattern_2000
                  $SFD_{12}$ = pattern_1000
$P_2$ = 11001011 01101000   $SFD_{21}$ = pattern_500
$P_3$ = 11100000 10101110 01101100   $SFD_{31}$ = pattern_250
                  $SFD_{32}$ = pattern_125

PREAMBLE DESIGN AND PROCESSING METHOD FOR ON-THE-FLY, FRAME-BY-FRAME AIR DATA RATE DETECTION IN WIRELESS RECEIVERS

CROSS-REFERENCE TO RELATED APPLICATIONS

This application claims the benefit of U.S. Provisional Application No. 61/427,265 filed on Dec. 27, 2010, entitled "PREAMBLE DESIGN AND PROCESSING FOR ON-THE-FLY, FRAME-BY-FRAME DATA RATE DETECTION IN WIRELESS RECEIVERS", which is incorporated herein in its entirety

TECHNICAL FIELD

The present disclosure relates to a system, method, transmitter, and receiver for frame-based wireless data transmissions.

BACKGROUND

Frame by frame or packet based data transmission is used in a wide variety of protocols. IEEE 802.15.4 defines a standard for wireless transmission with a data transmission rate of up to 250 kbps using a Direct Sequence Spread Spectrum (DSSS) modulation wherein a variety of carrier frequencies can be used in the physical layer. The most widely used variant of the standard for example uses the 2.4 GHz band for transmission with a fixed data rate of 250 kb/s. However, the fixed data rate may not be appropriate for all applications. Beside the standard compliant operating mode, a variety of manufacturers thus provide for proprietary modes that allow for additional speeds of 125 kbps, 500 kbps, 1 Mbps and 2 Mbps or a subset thereof.

With mobile devices battery life and consequently power consumption is an important consideration. In a wireless transceiver the radio when transmitting draws much higher power than the rest of the system in any of the other operational states. The radio transmitter thus is generally kept in a deep power-down state and switched on only for the time it takes to transmit the data. In multi-rate wireless transceivers, the power required for transmitting a data frame is proportional to the time it takes to put it on the air and independent of the rate of transmission. It then follows that the highest rate, permissible by the external limiting factors (system configuration, application requirement, channel characteristics etc.) is to be selected for each individual transmit operation. If, however, the decision is made independently by the transmitting device then the situation, illustrated by the simple wireless network configuration shown on FIG. 1, arises: a receiving device 110 has to learn the transmit rate from the received frame itself. As shown in FIG. 1, the first transmitter 120 and second transmitter 130 each constitute low power nodes which use the highest available data rate allowed by its link quality to save transmit power. The coordinator or receiver 110 needs to synchronize itself without advance knowledge of the incoming frame data rate.

In the universally adopted solution the initial part of a frame is always modulated at the lowest available rate and rate switching occurs only immediately after this. Referring to FIG. 2, again a transmitter 210 is sending a wireless transmission 220, 230 to a receiver 240. The rate switching happens in the Header part 230 when the receiver 240 is already decoding the frame 220. In wireless networks, for instance the ones built on the IEEE 802.15.4 standard, in which the overwhelming majority of data packets typically carry a few tens of byte payloads this leads to gross inefficiency as the comparisons on FIG. 3 indicate.

SUMMARY

There is a need for an improved system of a set of preambles and an associated preamble processing method.

According to an embodiment, a system for wireless communication may comprise a transmitter and a receiver, wherein the transmitter is operable to wirelessly transmit digital information to the receiver with a plurality of data transmission rates using a modulation format, wherein the digital information is transmitted using a transmission frame including a header part and a payload part, wherein the header part comprises a preamble, wherein the modulation format is the same for all data transmission rates and wherein the data transmission rate is at least encoded into the preamble of the frame, and wherein the receiver is configured to determine the data transmission rate when receiving the preamble.

According to a further embodiment, the header part may comprise a preamble, and a start frame delimiter. According to a further embodiment, the preamble may define one of a plurality of data transmission rate groups and the start frame delimiter can be configured to further define different data transmission rates within each data group. According to a further embodiment, the preambles for the respective data rate groups can be correlated with a received preamble to provide for preamble detection in a receiver. According to a further embodiment, a transmission time for the preamble and start frame delimiter for each data rate group may have a different length and is defined by a repetition of a chip sequence which encodes a data signal, wherein the chip sequence comprises a predefined chip pattern for each data rate group. According to a further embodiment, the preambles can be encoded to be DC-free. According to a further embodiment, the system may comprise a high data rate group, a medium data rate group and a low data rate group. According to a further embodiment, the high data rate group may comprise a first and second data transmission rate, wherein the medium data rate group comprises a third data transmission rate, and wherein the low data rate group comprises a fourth and fifth data transmission rate. According to a further embodiment, the preamble for the high data rate group may comprise a preamble pattern consisting of eight chips which is repeated eight times, wherein the preamble for the medium data rate group comprises a preamble pattern consisting of 16 chips which is repeated eight times, and wherein the preamble for the low data rate group comprises a preamble pattern consisting of 32 chips which is repeated eight or 16 times. According to a further embodiment, each chip of the eight chips for the high data rate group can be '11110000'; two consecutive chips for the 16 chips for the medium data rate group are '11001011_01101000', and four consecutive chips for the 32 chips for the low data rate group are '11100000_01110111_10101110_01101100'. According to a further embodiment, the start frame delimiter may comprise one of two distinct patterns for each data transmission rate in the high data rate group and in the low data rate group. According to a further embodiment, a first start frame delimiter pattern in the high data rate group may comprise 16 chips, a second start frame delimiter pattern in the medium data rate group comprises 32 chips and a third start frame delimiter pattern in the low data rate group comprises either 64 or 128 chips. According to a further embodiment, the first start frame delimiter pattern may define a data transmission rate of 2 Mbps or 1 Mbps, the second start frame delimiter pattern may define a data transmission rate of 500 kbps, and the third start frame delimiter pattern may define a data transmission rate of either 250 kbps or 125 kbps. According to a further embodiment, the receiver may comprise an automatic gain control unit. According to a further embodiment, the modulation format for all data transmission rates can be a 2 MBaud MSK modulation. According to a further embodiment, the preamble for the data transmission rates in the low data rate group can be compliant with IEEE 802.15.4.

According to another embodiment, a method for wireless communication may comprise: wirelessly transmitting digital information with a plurality of selectable data transmission rates using a modulation format, wherein the digital information is transmitted using a transmission frame including a header part and a payload part, wherein the header part comprises a preamble, and wherein the modulation format is the same for all data transmission rates and the data transmission rate is at least encoded into the preamble of the frame.

According to a further embodiment of the method, the header part comprises a preamble, and a start frame delimiter. According to a further embodiment of the method, the preamble may define one of a plurality of data rate groups and the start frame delimiter can be configured to further define different data transmission rates within each data group. According to a further embodiment of the method, the method may further comprise: correlating the preambles for the respective data rate groups with a received preamble to provide for preamble detection in a receiver. According to a further embodiment of the method, a transmission time for the preamble and start frame delimiter for each data rate group may have a different length and is defined by a repetition of a chip sequence which encodes a data signal, wherein the chip sequence comprises a predefined chip pattern for each data rate group. According to a further embodiment of the method, the preambles can be encoded to be DC-free. According to a further embodiment of the method, a high data rate group, a medium data rate group and a low data rate group may be used. According to a further embodiment of the method, the high data rate group may comprise a first and second data transmission rate, wherein the medium data rate group may comprise a third data transmission rate, and wherein the low data rate group may comprise a fourth and fifth data transmission rate. According to a further embodiment of the method, the preamble for the high data rate group may comprise a preamble pattern consisting of eight chips which is repeated eight times, wherein the preamble for the medium data rate group may comprise a preamble pattern consisting of 16 chips which is repeated eight times, and wherein the preamble for the low data rate group may comprise a preamble pattern consisting of 32 chips which is repeated eight or 16 times. According to a further embodiment of the method, each chip of the eight chips for the high data rate group can be '11110000'; two consecutive chips for the 16 chips for the medium data rate group can be '11001011_01101000', and four consecutive chips for the 32 chips for the low data rate group can be '11100000_01110111_10101110_01101100'. According to a further embodiment of the method, the start frame delimiter may comprise one of two distinct patterns for each data transmission rate in the high data rate group and in the low data rate group. According to a further embodiment of the method, a first start frame delimiter pattern in the high data rate group may comprise 16 chips, a second start frame delimiter pattern in the medium data rate group may comprise 32 chips and a third start frame delimiter pattern in the low data rate group may comprise either 64 or 128 chips. According to a further embodiment of the method, the first start frame delimiter pattern may define a data transmission rate of 2 Mbps or 1 Mbps, the second start frame delimiter pattern may define a data transmission rate of 500 kbps, and the third start frame delimiter pattern may define a data transmission rate of either 250 kbps or 125 kbps. According to a further embodiment of the method, the modulation format for all data transmission rates can be a 2 MBaud MSK modulation. According to a further embodiment of the method, the preamble for the data transmission rates in the low data rate group can be compliant with IEEE 802.15.4.

According to yet another embodiment, a receiver for wireless communication may be operable to wirelessly receive digital information with a plurality of data transmission rates using a modulation format, wherein the received digital information comprises a transmission frame including a header part comprising a preamble and a payload part, wherein the receiver is configured to determine a data transmission rate when receiving the preamble, wherein the modulation format is the same for all data transmission rates and the data transmission rate is at least encoded into the preamble of the frame.

According to yet another embodiment, a transmitter for wireless communication may be operable to wirelessly transmit digital information with a plurality of data transmission rates using a common modulation format, wherein the digital information is transmitted using a transmission frame including a header part and a payload part, wherein the header part comprises a preamble, wherein the data transmission rate is encoded at least into the preamble of the frame.

According to yet another embodiment, a preamble for use in a wireless communication system in which a transmitter wirelessly transmits digital information with a plurality of data transmission rates using a common modulation format is part of a transmission frame comprising a header part and a payload part, wherein the header part comprises the preamble, wherein the preamble is designed to encode the data transmission rate for each data transmission rate of the plurality of data transmission rates.

According to a further embodiment of the preamble, for a 2 Mbit and a 1 Mbit data transmission rate, the preamble may repeat the pattern '11110000' eight times, for a 500 kbit data transmission rate, the preamble may repeat the pattern '1100101101101000' eight times, for a 250 kBit data transmission rate, the preamble may repeat the pattern '11100000 01110111 10101110 01101100' eight times, and for a 125 kBit data transmission rate, the preamble may repeat the pattern '11100000 01110111 10101110 01101100' sixteen times.

BRIEF DESCRIPTION OF THE DRAWINGS

A more complete understanding of the present disclosure and advantages thereof may be acquired by referring to the following description taken in conjunction with the accompanying drawings wherein:

FIG. 3 illustrates the inefficiency of the standard air rate switching for short payloads and compares it to the optimal solution of transmitting the whole frame at the same air rate.

FIG. 5 displays the set of proprietary DSSS16 sequences used in spreading MSK symbols at the 500 kbps air data rate.

FIG. 6 lists the preamble patterns and start frame delimiters (SFD) used with frames at the standard and the different proprietary air data rates.

Figure 1:
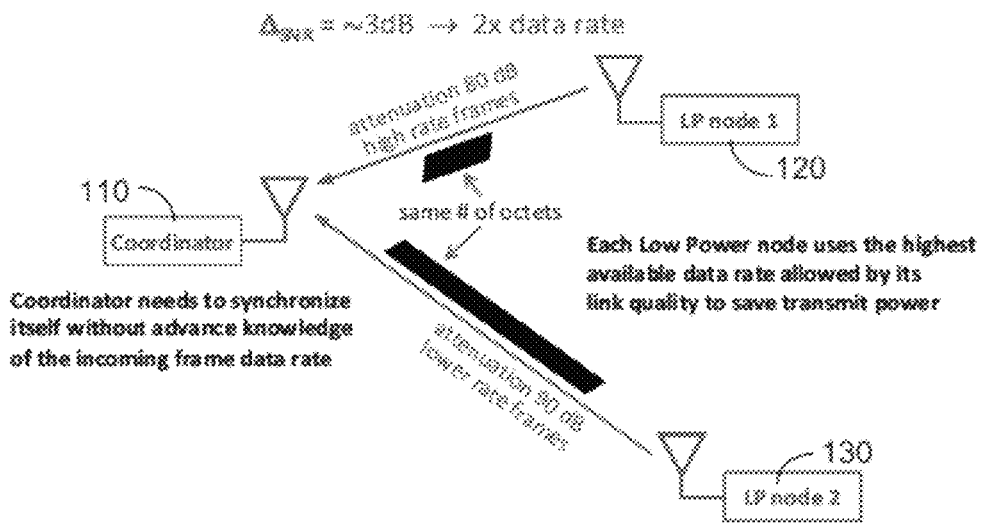
FIG. 1 displays a simple wireless network configuration where dynamic determination of the air data rate is required.
Figure 2:
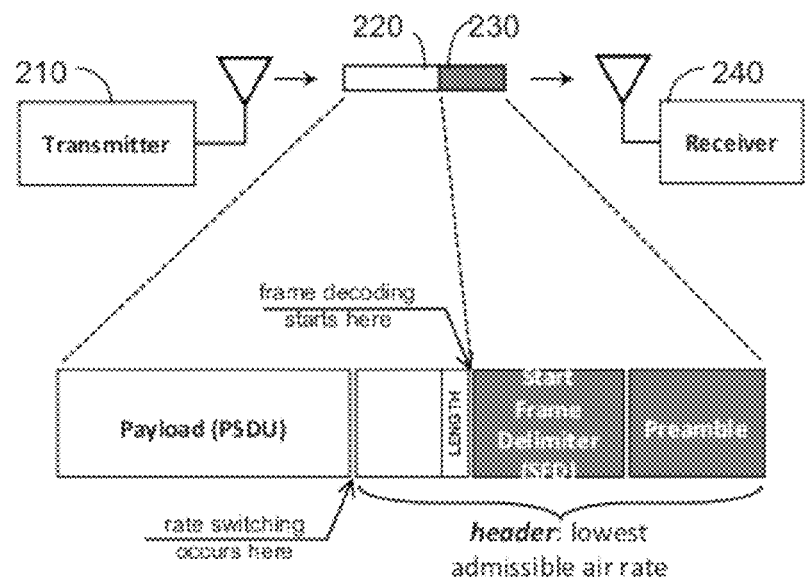
FIG. 2 shows that in the conventional systems rate switching occurs only after an initial segment transmitted at the lowest admissible air rate.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

DETAILED DESCRIPTION

According to various embodiments, a system of a set of preambles and an associated preamble processing method may provide for
transmitting the preamble and start-of-frame delimiter (SFD) at the rate of the payload; and
on-the-fly detection of the data rate of the incoming frames from the preamble and the SFD.
According to further embodiments, the system and method:
should be applicable with legacy, IEEE 802.15.4 compliant, radio designed for 2 MHz chip rate
should be suitable for zero-IF receiver; and
should support the standard IEEE 802.15.4 frame format.
The system and method according to various embodiments disclosed herein may meet all the foregoing requirements and additionally
uses 2 Mbaud MSK modulation;
varies the data bit rate by applying standard and proprietary spectrum spreading as well as industry-standard digital data encoding;
specifies a suite of preambles such that
each preamble specifically designed and optimized for one of the data rates;
all preamble patterns are DC-free, thus can be used with a zero-IF receiver, even though MSK signaling is used; and
the preambles have good cross-correlation properties in order to facilitate quick selection, even in the presence of carrier frequency offset between the transmitter and the receiver
defines the preamble processing method that utilizes the properties of the preamble suite for frame detection and on-the-fly data rate selection during preamble processing of an incoming frame.

In order to improve the efficiency of framing of packets in networks that support the simultaneous use of multiple data rates the header part of the frame should scale together with the payload, i.e. the whole frame should be transmitted at the same bit rate. It follows that the data rate should be encoded into and determined from the preamble of a frame. In a multi-rate receiver data rate selection thus occurs "on-the-fly", i.e. it is an integral part of the frame acquisition process.

Multi-rate devices in a network must coexist and interact with devices that conform to the underlying standard; in our case to IEEE 802.15.4.

The multi-rate system described in the present disclosure uses the 2 Mbaud MSK modulation format standardized in IEEE 802.15.4, satisfies the spectral mask and provides for the same channel occupation and center frequency selections. It also includes the standard 250 kbps frame format in the suite of defined frame formats. Direct Sequence Spectrum Spreading (DSSS) and 1/2 rate convolutional encoding is applied in combination for setting the different data rates.

DSSS is a mapping from data bits to a sequence of a smaller unit called "chip". In the present case an MSK symbol constitutes a chip, thus when it is appropriate the term "MSK chip" (or simply "chip") will be used in the sequel.

Figure 4:
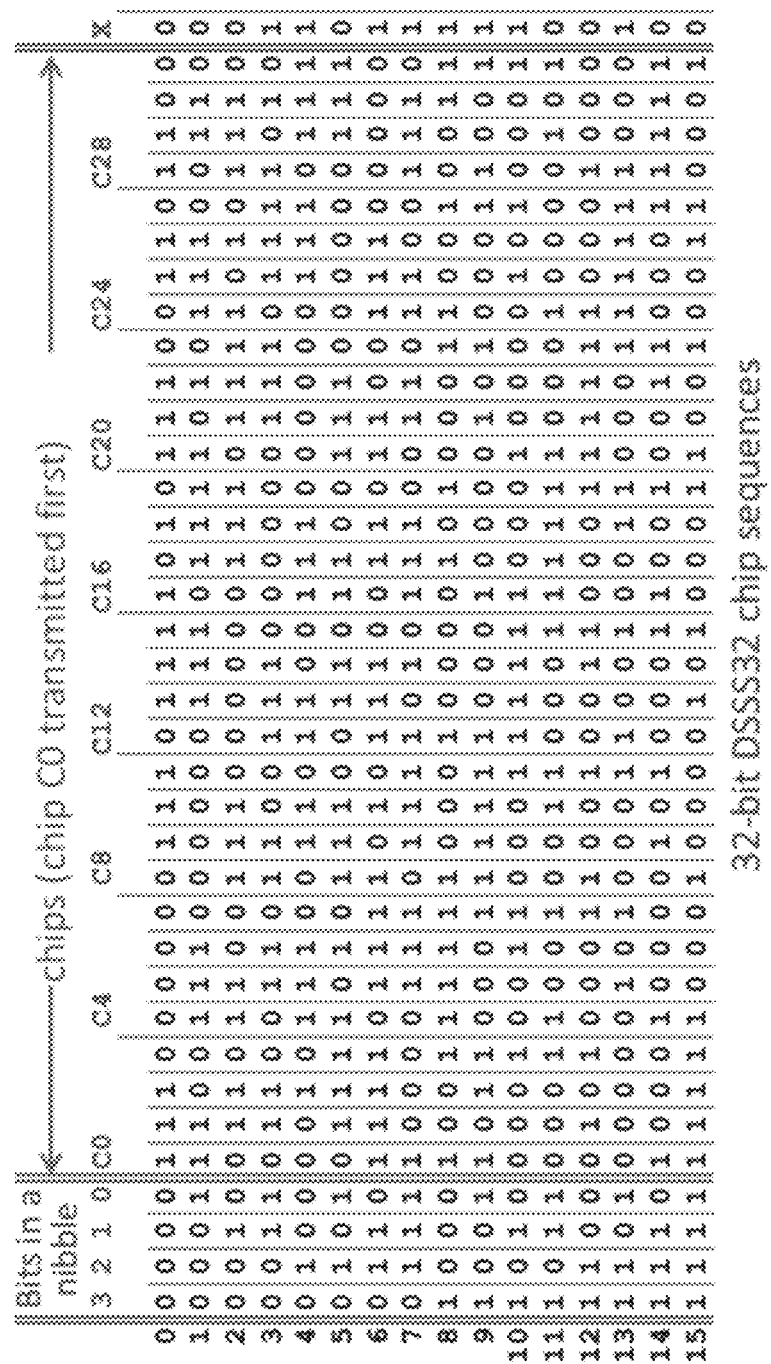
FIG. 4 displays the set of standard DSSS32 sequences used in spreading MSK symbols at different air data rates.

Two DSSS mappings are defined: the standard 32-chip DSSS32 on FIG. 4 and the proprietary 16-chip DSSS16 on FIG. 5. Both map 4-bit nibbles of the data into the corresponding chip sequence selected by the nibble. The first MSK chip transmitted is obtained as (C0 xor X), where X is the content of a binary state variable initialized to 0 at the start of the transmission; chips C1, C2, . . . are applied directly as input to the MSK modulation. After the last chip, the value in the last column of the table (X) is used to update the state variable X before the next DSSS symbol (i.e., chip sequence).

DSSS32 is constructed such that it results in waveforms identical to those of the DSSS-OQPSK modulation specified for the 2.4 GHz ISM-band operation by the IEEE 802.15.4 standard. Since 4 bits map to 32 chips, the spreading factor is 32/4=8, hence 2 MCps chip rate corresponds to 250 kbps bit rate.

DSSS16 is new and proprietary, and constructed to support reliable distinction between the 500 kbps air data rate and the other data rates in the receiver. Since 4 bits map to 16 chips, the spreading factor is 16/4=4, hence 2 MCps chip rate corresponds to 500 kbps bit rate.

The suite of preambles (preamble patterns+SFD) defined for the system described in the present disclosure is specified on FIG. 6.

Figures 7, 8:
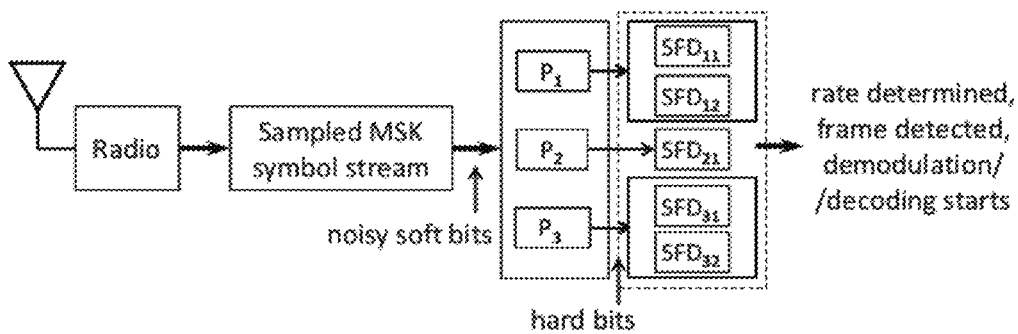
FIG. 7 tabulates the frame formats different for the different air rates and shows how the preambles scale with the data rate.
FIG. 8 shows that determining the air data rate from the frame preamble require running as many preamble searches in parallel than there are possible preamble air data rates.

Beyond compatibility with IEEE 802.15.4 networks (see above) preambles in the suite also have the following essential properties:
a shown in FIG. 7, header duration scales with the selected air data rate although the MSK baud rate is constant;

cross-correlation between any two of the different preamble waveforms is low, even when the waveforms are distorted by carrier frequency offset;

all preamble patterns are DC-free, thus can be used with a zero-IF receiver, even though MSK signaling is used.

1 Mbps data is encoded with an (industry standard) 1/2 rate convolutional code and the result is transmitted at 2 Mbps. The same encoding is applied to 125 kbps data and the result is transmitted a 250 kbps. Thus there are only 3 different preamble patterns in the suite: one for 2 Mbps, 500 kbps and 250 kbps each (FIG. 6), and the ambiguity is resolved by the unique SFD pattern assigned to each data rate.

The 250 kbps preamble pattern and SFD in the suite is taken from the IEEE 802.15.4 PHY standard. Since standard compliant devices will successfully demodulate frames with this preamble, the payload shall contain a standard compliant MAC-frame to ensure coexistence. If the MAC-protocol is proprietary, the PHY format should also be different from the one defined in the standard, so that standard compliant devices could silently discard the frame before parsing it. This is achieved by replacing the standard pattern_250 by a software configurable one.

The following selection rules apply to the software configurable SFD patterns:

pattern_2000 and pattern_1000 must differ at least in 4 bits from each other and the 1111_0000 preamble pattern;

pattern_125 must be selected such that the two DSSS symbols transmitted first differ from the selected (standard or proprietary) pattern_250;

the first transmitted DSSS symbol in pattern_125 and pattern_250 must be selected from rows #1 through #15 of the DSSS32 table (FIG. 4);

the first transmitted DSSS symbol in pattern_500 must be selected from rows #1 through #15 of the DSSS16 table (FIG. 5).

Using the suite of defined preambles (FIG. 6) air data rate can be detected in two stages:

1 as shown in FIG. 8, the input is simultaneously monitored for the presence of the 2 Mbps, 500 kbps, 250 kbps preambles until the presence of one of them can be detected with sufficient reliability;

2 after a valid preamble is located and establishes symbol boundary search is initiated for the Start Frame Delimiter that may further distinguish between air data rates.

Header processing is required to work at least as reliably as the demodulation. To meet this requirement longer preamble and 16-bit SFD is defined for frames where the payload data rate is lower than the air data rate of the preamble and the SFD as at a given signal-to-noise ratio, the bit-error probability differs for the two rates. This is the case with the 125 kbps and 1 Mbps payload rates. For instance, the 2 Mbps SFD is received with 3% bit-error-rate probability when for the same frame the 1 Mbps payloads can be demodulated with a BER (Bit-Error-Rate) of 1/10000.

A known technique for tolerating the relatively high bit-error probability is to handle a certain number of bit errors forgivingly in the SFD match.

For the 125 kbps data rate the last decoded four nibbles and the nibbles of pattern_125 must match in at least 3 nibble positions.

At 1 Mbps the match tolerates single bit or maximum 2 noncontiguous 2-bit burst differences in the comparison of the last received 16 bits and pattern_125. (Simultaneous isolated single bit mismatches at both ends of the pattern constitute a single 2-bit mismatch burst.)

Figure 9:
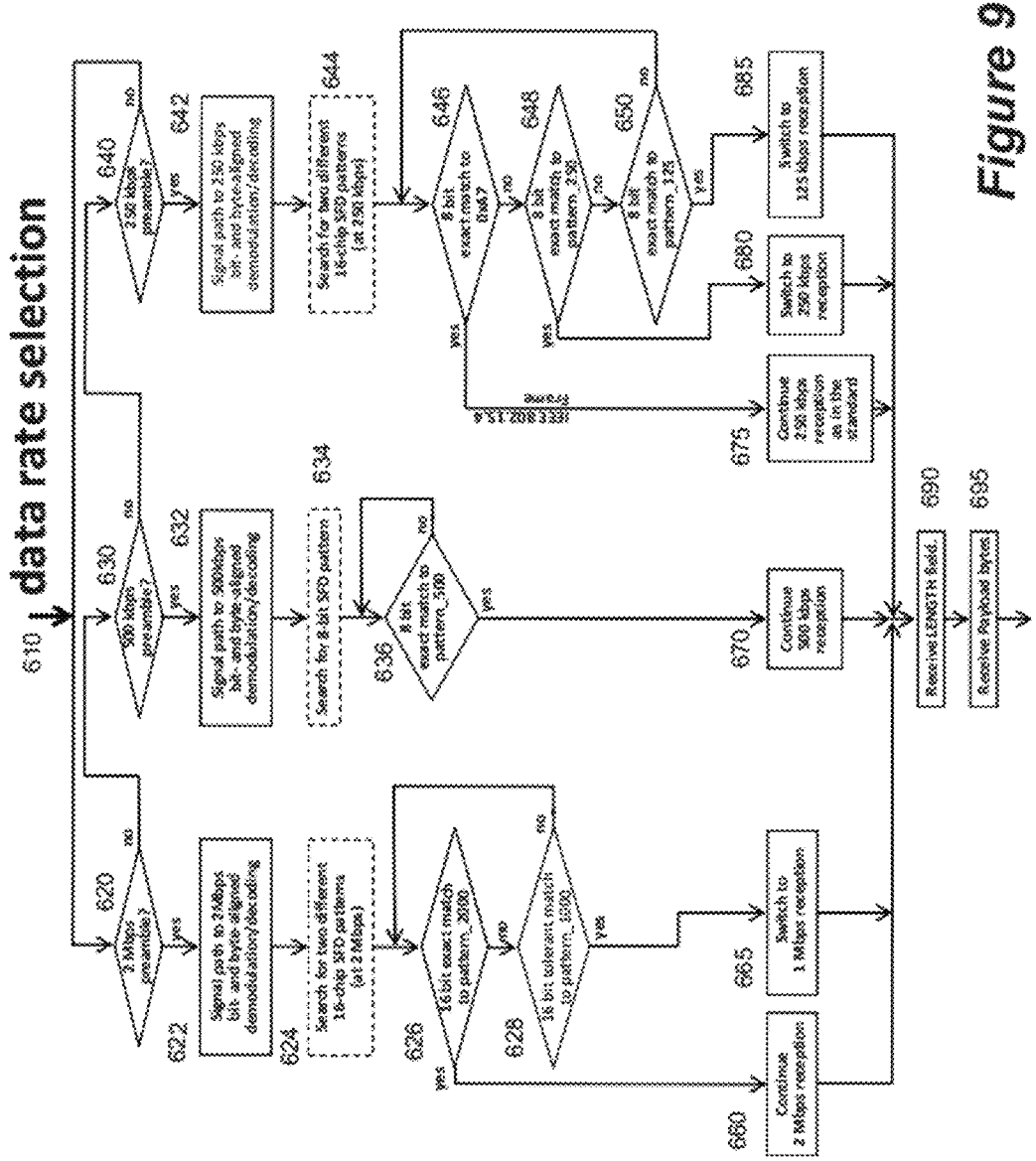
FIG. 9 shows a flow chart of data rate selection according to various embodiments.

Search for the SFD pattern is started once the header data rate has been determined. The logic flow of the process is presented in FIG. 9. The method starts in step 610 and first tests in step 620 for a 2 Mb/s preamble. If not found, the routine moves to step 630 for checking the 500 kp/s preamble and in step 640 for finding the 250 kb/s preamble. If one of these preambles has been found, the routine follows up with steps 622, 624, 626, 628 for the 2 Ms/s preamble, steps 632, 634, 636 for the 500 kb/s preamble and steps 642, 644, 646, 648, and 650 for the 250 kb/s preamble. In steps 626 and 628 a test between the patterns distinguishing between the 2 Mb/s and 1 Mb/s start frame delimiters is made and the routine branches to either step 660 or 665. In the 500 kb/s merely a confirmation test is made in the step 636. In the 250 kb/s branch, steps 646, 648 and 650 are used to distinguish between the standard frame, the proprietary 250 kb/s frame and the 125 kb/s frame. Thus, this routine branches into one of three branches with steps 675, 680 or 685. The routine ends with the common reception of the LENGTH field 690 and the payload bytes in step 695.

Figure 10:
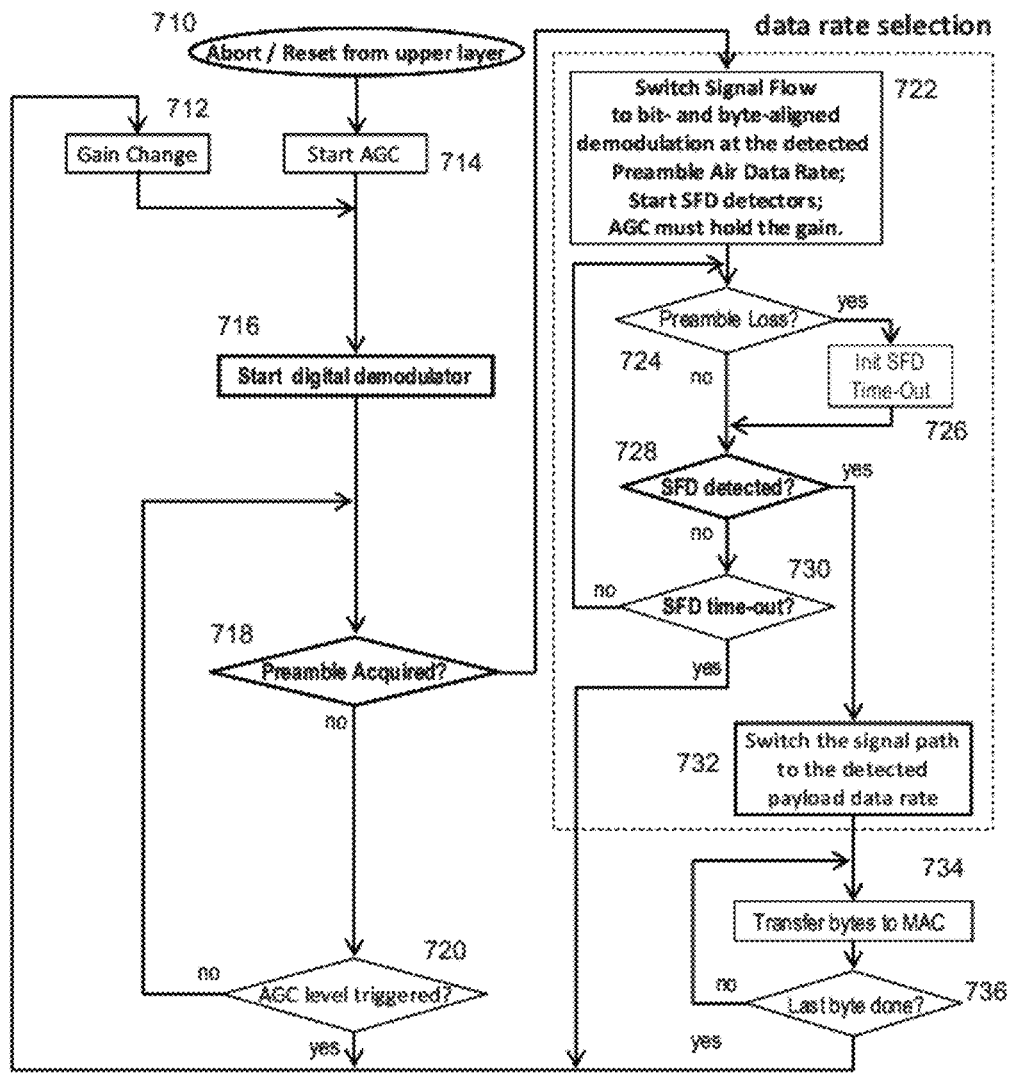
FIG. 10 shows a more general flow chart of the overall frame detection/acquisition according to various embodiments.

The operation mode of the signal processing path is switched once the preamble is detected and possibly switched again, after the SFD is detected. This requires defining a time-out mechanism for the SFD search, otherwise failure to locate the valid SFD could cause the receiver to stall or collect garbage frames. The time-out mechanism is shown as part of the flow of the overall frame detection/acquisition on FIG. 10. The routine starts in step 710 and starts the automatic gain control in step 714. In step 716, the digital demodulator is started and in step 718, it is checked whether a preamble has been acquired. if yes, the routine moves to step 722. If no, the AGC gain is changed through steps 720 and 712 and the routine moves again to step 716. In step 722, the signal flow is switched to bit and byte aligned demodulation at the detected preamble air data rate, the start frame delimiter detectors are activated and the AGC is controlled to hold the current gain. In step 724 it is tested whether a preamble loss occurred and if so a time out is initiated in step 726. In step 728 it is checked whether the start frame delimiter has been detected and if yes, the routine moves to step 732. If no, a time out is initiated in step 730 and the routine turns to step 712 to adjust the gain. In step 732, the signal path is switched to the detected payload data rate and in step 734, bytes are transferred to the MAC layer. the routine then checks whether the last byte has been transferred and continues with step 712 if so and otherwise repeats the transfer in step 734.

The preambles are composed by repeating 3 distinct MSK chip sequences:

||11110000|| ||11001011 01101000|| ||11100000 10101110 01101100|| for 2 Mbps, 500 kps and 250 kbps, respectively.

Bipolar scalar output from a non-coherent MSK demodulator is correlated against the expected preamble chip patterns in a sliding time window twice in a chip-time. The correlations are evaluated by matched filters. They are computed simultaneously for each air data rate and at several different lengths at the same time. The outputs from the matched filters are weighted to make them comparable when they compete for a shared hardware resource.

Preamble acquisition needs to be sufficiently sensitive and reliable to level the robustness of the payload demodulation, so as not to become a limiting factor for the performance.

The various embodiments aim for shortest preamble length and best hardware efficiency, the conventional non-coherent preamble detector cannot meet the requirements on miss-detect probability and false alarm probability at the same time.

Better detection performance can be obtained by a coherent or block-noncoherent preamble demodulator. However this is only possible after AFC has compensated for the carrier frequency offset. A free-running compensation (performed simultaneously per each air data rate) would result in unacceptable hardware requirements and would increase the power consumption as well. Instead, AFC should be a shared resource between the different data rates and its operation should be triggered as a one shot execution based on a known symbol boundary and a known air data rate. Since this information is only available following detection, a solution has to be provided to break out of the vicious cycle.

The solution to this problem is to allow a relatively high false alarm rate for the detector by setting a very low trigger threshold level, and letting the AFC decide if the detection event is rejected or accepted after CFO compensation is accomplished and coherent or block-coherent correlation can provide the accurate answer.

Figure 12:
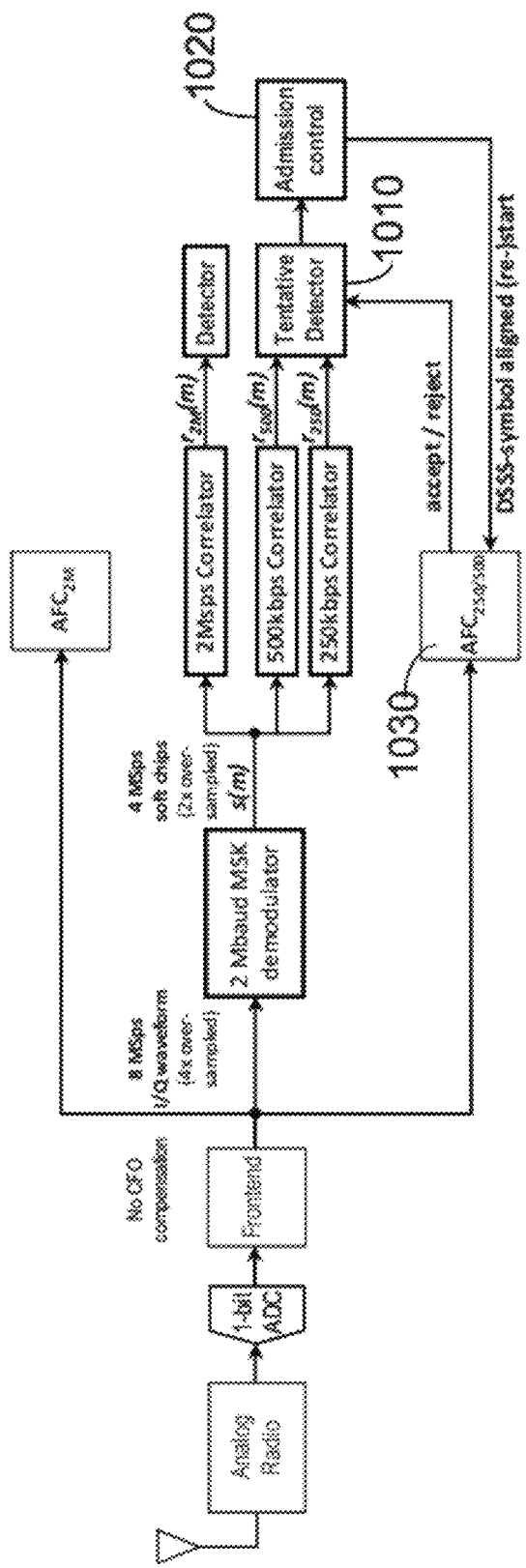
FIG. 12 shows the chain of blocks that are involved in preamble processing.

Referring to FIG. 12, the "Tentative Detector" 1010 receives the correlation amplitudes obtained with varied correlation length for both the 250 kbps and the 500 kbps preambles. The greatest value is selected as SURVIVOR and passed on to the "Admission Control" unit 1020. SURVIVOR is updated at 4 MSps rate.

"Admission Control" unit 1020 decides if SURVIVOR is greater than any previously seen SURVIVOR and whether it should trigger a carrier frequency offset estimation by (re-) starting $AFC_{250/500}$ 1030. This is called a RESTART event.

On RESTART $AFC_{250/500}$ 1030 performs a one-shot computation that takes 4 DSSS symbol times. Any on-going AFC computation is aborted if RESTART occurs.

When $AFC_{250/500}$ 1030 completes it provides feedback to the Tentative Detector 1010 whether to ACCEPT or REJECT the correlation peak as indication of a valid preamble.

The details of the operation are given below.

Referring to FIG. 6 there are three different preamble patterns used in the different frame formats. The chip patterns repeated in the preambles are, in the order of transmission:

$\{b_{2m}(m)\}_{m=0 \ldots 7}$=11110000: 2 Mbps and 1 Mbps data rates $\{b_{500}(m)\}_{m=0 \ldots 15}$=11001011 01101000: 500 kbps data rate $\{b_{250}(m)\}_{m=0 \ldots 31}$=11100000 01110111 10101110 01101100: 250 kbps and 125 kbps data rates For convenience, the bipolar representations of the same sequences are also defined:

$p_{2m}(m)=2 \cdot b_{2M}(m)-1$ $p_{500}(m)=2 \cdot b_{500}(m)-1$ $p_{250}(m)=2 \cdot b_{250}(m)-1$ The [I; Q] stream can be computed as:

$I(m)=\cos(\varphi(m))$ and $Q(m)=\sin(\varphi(m))$ where $$\varphi(m+1) = \frac{\pi}{2} \cdot \frac{1}{Ovs} \cdot p_{rate}(m) + \varphi(m)$$

for m=0, 1, . . . ; rate $\in$ {2M, 500, 250} and $\varphi(0)=0$;

the oversampling factor Ovs=1 for 2 MSps sampling.

Bipolar scalar values s(n) output from a non-coherent MSK demodulator are correlated against the expected preamble chip patterns in a sliding time window twice in a chip-time. The correlations are evaluated by matched filters. They are computed simultaneously for each air data rate and for different lengths at the same time. As a result, six filtering operations are going on simultaneously:

$$r_{HIGH}(n) = \kappa_1 \cdot \frac{1}{\sqrt{M}} \cdot \sum_{m=0}^{M-1} s(n-2m) \cdot q_{2M}(m): M = 32$$

$$r_{MID,M}(n) = \kappa_2 \cdot \frac{1}{\sqrt{M}} \cdot \sum_{m=0}^{M-1} s(n-2m) \cdot q_{500}(m): M = 32 \text{ and } 48$$

$$r_{LOW,M}(n) = \kappa_2 \cdot \frac{1}{\sqrt{M}} \cdot \sum_{m=0}^{M-1} s(n-2m) \cdot q_{250}(m):$$

$M = 64, 96$ and $160$ where the indices 2M, 500, 250 correspond to 2 Mbps, 500 kbps and 250 kbps preambles, respectively;

$q_{2M}(m)=p_{2M}((M-1-m) \mod 8)$ with M=32 is the time reversed 2 Mbps preamble pattern containing 4 repetitions (i.e., 4 octets)

$q_{500}(m)=p_{500}((M-1-m) \mod 16)$ with M=32 or 48 is the time reversed 500 kbps preamble pattern with 2 or 3 repetitions (i.e., 2 or 3 nibbles)

$q_{250}(m)=p_{250}((M-1-m) \mod 32)$ with M=64 or 96 or 160 is the time reversed 250 kbps preamble pattern with 2 or 3 or 5 repetitions (i.e., 2, 3 or 5 nibbles)

$\kappa_1$ and $\kappa_2$ are suitably selected scaling factors for lowest complexity hardware implementation The length-dependent scaling factors are necessary to level the standard deviation of the quantities $r_{250,M}$ and $r_{500,M}$. Thus they can be compared against each other when they compete for a given hardware resource.

To accept a frame the absolute value of the quantity R defined by the following correlation between the CFO-compensated received waveform and the expected DSSS waveform must exceed a predefined absolute threshold:

$$R = \frac{1}{L} \cdot \sum_{m=0}^{L-1} \exp(-j \cdot C\hat{F}O \cdot T \cdot m) \cdot v(m) \cdot (I(m) - j \cdot Q(m))$$

$$L = \begin{cases} 32 & \text{rate = 500 kbps} \\ 64 & \text{rate = 250 kbps} \end{cases}$$

where $C\hat{F}O$ is the carrier frequency offset estimate that aims at maximizing R. It is available when the AFC completes in radian/second.

T is the sample period v(m), m=0, . . . , L-1 is the sequence of I+jQ complex samples received at 4 MSps, starting from the RESTART event.

$I(m)=\cos(\varphi(m))$ and $Q(m)=\sin(\varphi(m))$ with $\varphi(m+1)=\pi/4 \cdot p_{rate}(m)+\varphi(m)$ for m=0, 1, . . . , $\varphi(0)=0$ and $p_{rate}$ is the bipolar representation of a preamble period for 500 kbps and 250 kbps respectively.

The details of the Admission Control 1020 are elaborated on below. Using these definitions:

SURVIVOR greatest correlation amplitude value selected by "Tentative Detector" 1010, updated at 4 MSps RATE takes the value of "250 kbps" or "500 kbps" depending on which correlator generated SURVIVOR AFCBUSY TRUE if AFC estimation is on-going, FALSE if AFC is inactive (e.g. completed by REJECT).

THRDFLT default value taken by THR when AFCBUSY=FALSE

THR dynamically adjusted threshold based on the latest SURVIVOR:

$$THR \Leftarrow \begin{cases} THRDFLT & AFCBUSY = FALSE \\ SURVIVOR & SURVIVOR > THR \\ THR & \text{otherwise} \end{cases}$$

L DSSS symbol length in 4 MSps samples. L=64 for 250 kbps, L=32 for 500 kbps.

SAMPCNT sample counter is a modulo L counter started on RESTART, incremented on each new sample while AFCBUSY=TRUE:

$$SAMPCNT \Leftarrow \begin{cases} 0 & AFCBUSY = FALSE \\ 1 & RESTART = TRUE \\ (SAMPCNT + 1) \bmod L & \text{otherwise} \end{cases}$$

DSSSCNT DSSS symbol counter started on RESTART:

$$DSSSCNT \Leftarrow \begin{cases} 0 & AFCBUSY = FALSE \\ DSSSCNT + 1 & SAMPCNT = L - 1 \\ DSSSCNT & \text{otherwise} \end{cases}$$

The Admission Control 1020 is defined by:
RESTART:=TRUE iff TRIGGER AND NOT(INHIBIT)
TRIGGER:=TRUE iff THR<SURVIVOR
INHIBIT:=AFCBUSY AND [(SAMPCNT=0) OR (SAMPCNT=1 AND DSSSCNT>0) OR (SAMPCNT=L-1)]

Figure 11:
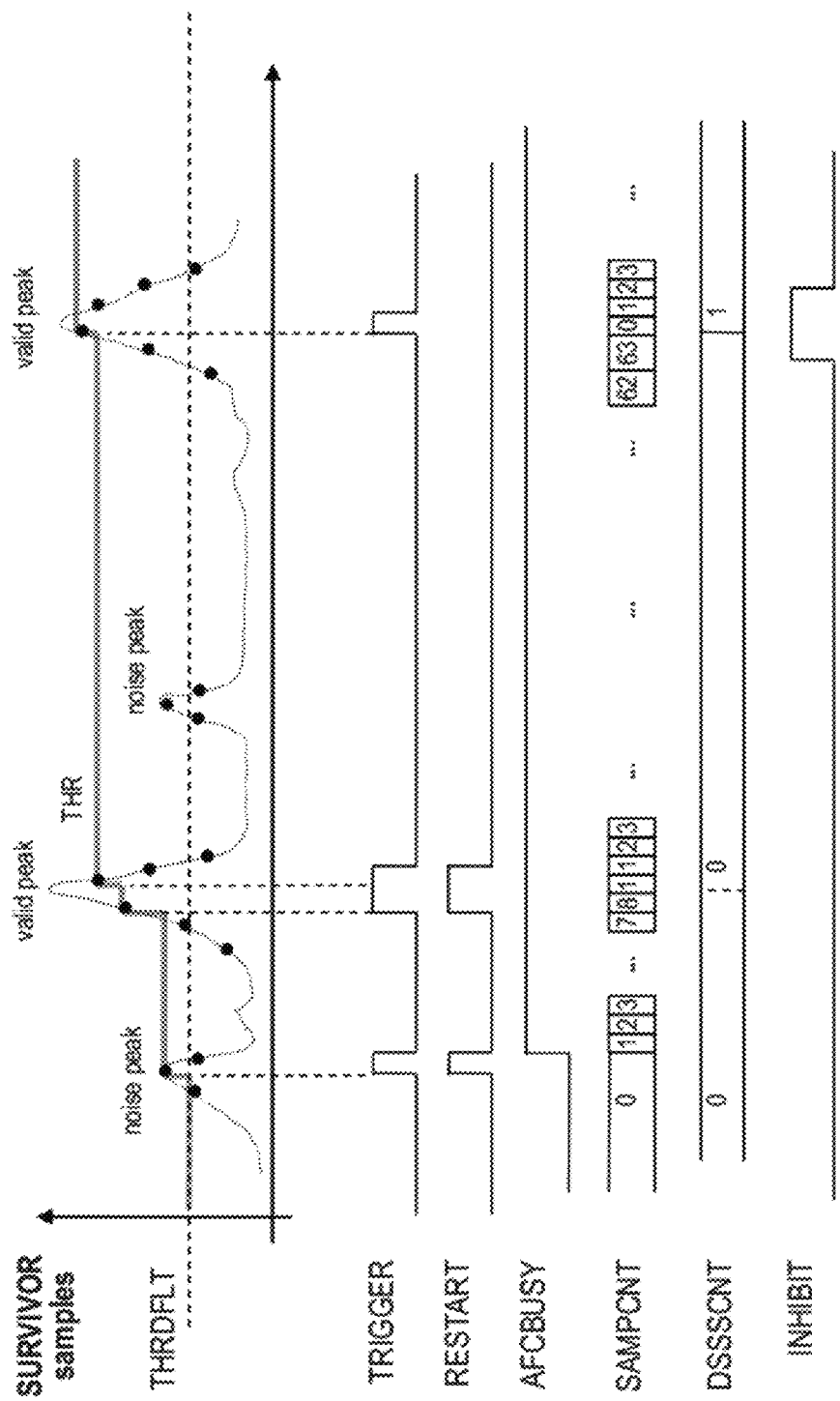
FIG. 11 shows the timing diagram of an admission control example.

The operation is illustrated by an example scenario in FIG. 11. Note that the second valid peak does not cause a RESTART due to the INHIBIT signal. Meanwhile the highest sample of the first valid peak can cause a restart, which is necessary for the optimal symbol level synchronization.

Figure 13:
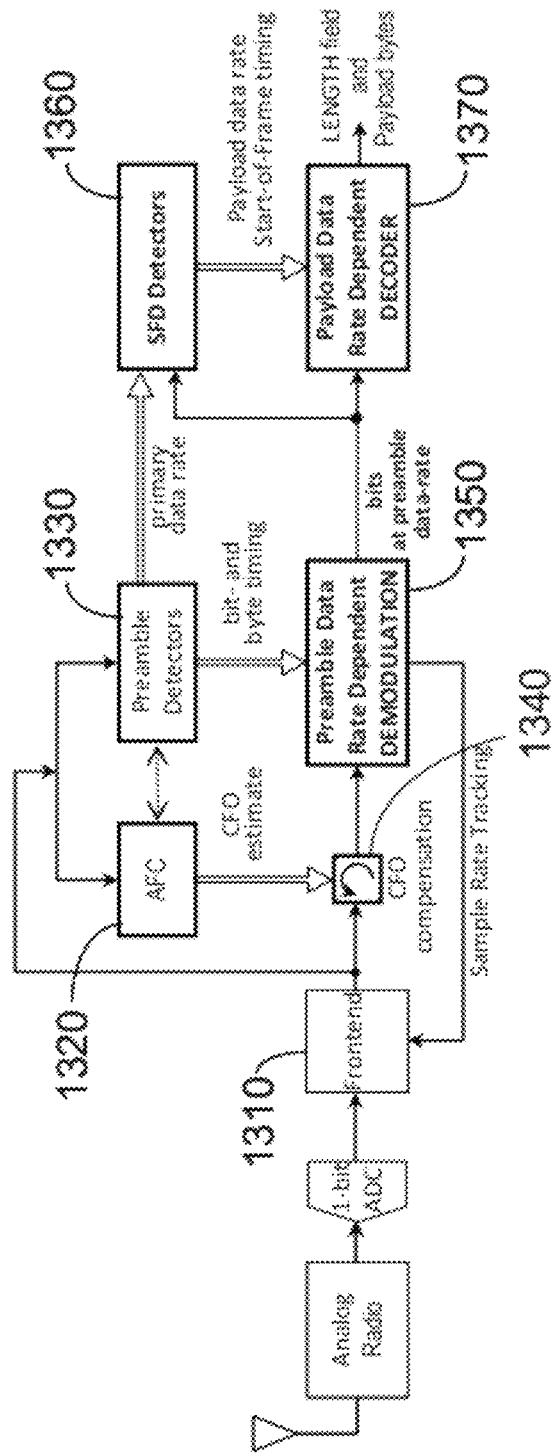
FIG. 13 shows that the preamble and the payload are processed at different rates and the SFD plays a role in selecting the payload data rate.

FIG. 13 presents the summary view of on-the-fly data rate detection. The MSK modulated I-Q format signal available at the output of the digital frontend 1310 is fed directly into the open-loop AFC units 1320 that return the estimate of the CFO (carrier frequency offset) present in the signal that is then used to remove 1340 the effect of the CFO from the signal.

The output of the digital frontend 1310 is also directly fed into the preamble detectors 1330. As explained above the bank of preamble detectors determines chip (bit) timing, and identifies the spreading sequences present in the preamble, consequently determining the primary data rate (250 kbps, 500 kbps or 2 Mbps) and establishing the DSSS symbol boundaries (byte timing). With this data the preamble data rate dependent demodulator 1350 turns the input signal into a stream of bits (chips) and the bank of SFD detectors 1360 locate the start of the payload and simultaneously pass the detected data rate to the data rate dependent decoder 1370.

What is claimed is:

1. A system for wireless communication comprising a transmitter and a receiver, wherein the transmitter is operable to wirelessly transmit digital information using a common modulation format to the receiver with a selected data transmission rate, wherein the data transmission rate can be selected from a predetermined plurality of data transmission rates, wherein the digital information is transmitted using a transmission frame including a header part and a payload part, wherein the header part comprises a preamble, wherein the preamble is transmitted first within the transmission frame, wherein the modulation format is the same for all data transmission rates, wherein the header and payload parts are transmitted at a same data rate for any of the selected data transmission rates, and wherein the receiver is configured to receive the preamble and to sample the preamble with different sample rates and select the sample rate that produces a valid preamble from the received preamble, wherein the header part comprises the preamble, and a start frame delimiter, wherein the selected sample rate from the preamble defines one of a plurality of data transmission rate groups and the start frame delimiter is configured to further define different data transmission rates within a data transmission rate group, and wherein a transmission time for the preamble and the start frame delimiter for each of the plurality of data transmission rate groups has a different length and is defined by a repetition of a chip sequence which encodes a data signal, wherein the chip sequence comprises a predefined chip pattern for each of the plurality of data transmission rate groups.

2. The system according to claim 1, wherein the preambles for respective data transmission rate groups are correlated with the received preamble to provide for preamble detection in a receiver without the receiver knowing an actual transmission rate.

3. The system according to claim 2, comprising a high data rate group, a medium data rate group and a low data rate group.

4. The system according to claim 3, wherein the high data rate group comprises a first and second data transmission rate, wherein the medium data rate group comprises a third data transmission rate, and wherein the low data rate group comprises a fourth and fifth data transmission rate.

5. The system according to claim 4, wherein the preamble for the data transmission rates in the low data rate group are compliant with IEEE 802.15.4.

6. The system according to claim 3, wherein the preamble for the high data rate group comprises a preamble pattern consisting of eight chips which is repeated eight times, wherein the preamble for the medium data rate group comprises a preamble pattern consisting of 16 chips which is repeated eight times, and wherein the preamble for the low data rate group comprises a preamble pattern consisting of 32 chips which is repeated eight or 16 times.

7. The system according to claim 6, wherein each chip of the eight chips for the high data rate group is '11110000'; two consecutive chips for the 16 chips for the medium data rate group are '11001011_01101000', and four consecutive chips for the 32 chips for the low data rate group are '11100000_01110111_10101110_01101100'.

8. The system according to claim 3, wherein the start frame delimiter comprises one of two distinct patterns for each data transmission rate in the high data rate group and in the low data rate group.

9. The system according to claim 3, wherein a first start frame delimiter pattern in the high data rate group comprises 16 chips, a second start frame delimiter pattern in the medium data rate group comprises 32 chips and a third start frame delimiter pattern in the low data rate group comprises either 64 or 128 chips.

10. The system according to claim 9, wherein the first start frame delimiter pattern defines a data transmission rate of 2 Mbps or 1 Mbps, the second start frame delimiter pattern defines a data transmission rate of 500 kbps, and the third start frame delimiter pattern defines a data transmission rate of either 250 kbps or 125 kbps.

11. The system according to claim 3, wherein the modulation format for all data transmission rates is a 2MBaud minimum-shift keying (MSK) modulation.

12. The system according to claim 1, wherein the preambles are encoded to be direct current free.

13. The system according to claim 1, wherein the receiver comprises an automatic gain control unit.

14. A method for wireless communication, comprising: wirelessly transmitting digital information using a common modulation format with a selected data transmission rate, wherein the data transmission rate can be selected from a plurality of selectable data transmission rates, wherein the digital information is transmitted using a transmission frame including a header part and a payload part, wherein the header part comprises a preamble which is transmitted first within the transmission frame, wherein the header and payload parts are transmitted at a same data rate for all data transmission rates, and wherein the modulation format is the same for all data transmission rates, and wherein a receiver receives the preamble and samples the received preamble at different sample rates and determines which sample rate produces a valid preamble to allow selection of an actual data transmission rate, wherein the header part comprises a preamble, and a start frame delimiter, wherein the selected sample rate from the preamble defines one of a plurality of data rate groups and the start frame delimiter can be configured to further define different data transmission rates within each of the plurality of data rate groups, and wherein a transmission time for the preamble and the start frame delimiter for each data rate group has a different length and is defined by a repetition of a chip sequence which encodes a data signal, wherein the chip sequence comprises a predefined chip pattern for each data rate group.

15. The method according to claim 14, comprising correlating the preambles for respective data transmission rate groups with a received preamble to provide for preamble detection in a receiver.

16. The method according to claim 15, comprising a high data rate group, a medium data rate group and a low data rate group.

17. The method according to claim 16, wherein the high data rate group comprises a first and second data transmission rate, wherein the medium data rate group comprises a third data transmission rate, and wherein the low data rate group comprises a fourth and fifth data transmission rate.

18. The method according to claim 17, wherein the preamble for the data transmission rates in the low data rate group are compliant with IEEE 802.15.4.

19. The method according to claim 16, wherein the preamble for the high data rate group comprises a preamble pattern consisting of eight chips which is repeated eight times, wherein the preamble for the medium data rate group comprises a preamble pattern consisting of 16 chips which is repeated eight times, and wherein the preamble for the low data rate group comprises a preamble pattern consisting of 32 chips which is repeated eight or 16 times.

20. The method according to claim 19, wherein each chip of the eight chips for the high data rate group is '11110000'; two consecutive chips for the 16 chips for the medium data rate group are '11001011_01101000', and four consecutive chips for the 32 chips for the low data rate group are '11100000_01110111_10101110_01101100'.

21. The method according to claim 16, wherein the start frame delimiter comprises one of two distinct patterns for each data transmission rate in the high data rate group and in the low data rate group.

22. The method according to claim 16, wherein a first start frame delimiter pattern in the high data rate group comprises 16 chips, a second start frame delimiter pattern in the medium data rate group comprises 32 chips and a third start frame delimiter pattern in the low data rate group comprises either 64 or 128 chips.

23. The method according to claim 22, wherein the first start frame delimiter pattern defines a data transmission rate of 2 Mbps or 1 Mbps, the second start frame delimiter pattern defines a data transmission rate of 500 kbps, and the third start frame delimiter pattern defines a data transmission rate of either 250 kbps or 125 kbps.

24. The method according to claim 16, wherein the modulation format for all data transmission rates is a 2MBaud minimum-shift keying (MSK) modulation.

25. The method according to claim 14, wherein the preambles are encoded to be direct current free.

26. A receiver for wireless communication, wherein the receiver comprises a radio unit operable to receive a radio frequency signal, a sampling unit for converting the radio frequency signal into a data stream, and a processing unit, wherein the radio frequency signal encodes digital information using a common modulation format with a selected data transmission rate, wherein the data transmission rate can be selected from a plurality of data transmission rates, wherein the received data stream comprises a transmission frame including a header part comprising a preamble, and a payload part, wherein the header and payload parts are transmitted at a same data rate for all data transmission rates, wherein the preamble is received first within the transmission frame, wherein the receiver is configured to determine a data transmission rate after receiving the header from information encoded in the preamble, wherein the modulation format is the same for all data transmission rates and wherein the receiver is configured to sample the received preamble at different sample rates and determines which sample rate produces a valid preamble to allow selection of an actual transmission rate, wherein the header part comprises the preamble, and a start frame delimiter, wherein the selected sample rate from the preamble defines one of a plurality of data transmission rate groups and the start frame delimiter is configured to further define different data transmission rates within a data transmission rate group, and wherein a transmission time for the preamble and the start frame delimiter for each of the plurality of data transmission rate groups has a different length and is defined by a repetition of a chip sequence which encodes a data signal, wherein the chip sequence comprises a predefined chip pattern for each of the plurality of data transmission rate groups.

27. A transmitter for wireless communication, wherein the transmitter comprising a data processing unit and an antenna for wirelessly transmitting digital information, wherein the digital information is transmitted using a common modulation format with a selected data transmission rate, wherein the data transmission rate can be selected from a plurality of data transmission rates, wherein the digital information is transmitted using a transmission frame including a header part and a payload part, wherein the header part comprises a preamble, wherein the preamble is transmitted first within the transmission frame, wherein a common sampling rate is selected from a group consisting of 2 Msps, 500 ksps and 250 ksps is used and wherein the header part further comprises a start frame delimiter, which is configured to further define different data transmission rates within a data transmission rate group, and wherein a transmission time for the preamble and the start frame delimiter for each of the plurality of data transmission rate groups has a different length and is defined by a repetition of a chip sequence which encodes a data signal, wherein the chip sequence comprises a predefined chip pattern for each of the plurality of data transmission rate groups, and wherein the header and payload parts are transmitted at a same data rate for all data transmission rates.

28. A method for generating a preamble for use in a wireless communication system in which a transmitter wirelessly transmits digital information using a common modulation format with a plurality of data transmission rates, the method comprising the step of:
  selecting a data transmission rate out of a plurality of available transmission rates arranged in transmission rate groups;
  providing the preamble as a first part of a transmission frame comprising a header part and a payload part, wherein the header part comprises the preamble followed by a start frame delimiter, which is configured to further define different data transmission rates within a data transmission rate group, wherein a transmission time for the preamble and the start frame delimiter for each of the plurality of data transmission rate groups has a different length and is defined by a repetition of a chip sequence which encodes a data signal, wherein the chip sequence comprises a predefined chip pattern for each of the plurality of data transmission rate groups;
  transmitting the header with a same data transmission rate as the payload part for all data transmission rates;
  receiving the preamble and sampling the preamble at a first sample rate;
  determining whether a valid preamble at the first sample rate has been received and if not, then sampling the preamble at a second sample rate and determining whether a valid preamble at the second sample rate has been received and if not, then sampling the preamble at a third sample rate and determining whether a valid preamble at the third sample rate has been received,
  sampling the start frame delimiter at a sample rate that produces a valid preamble wherein an actual transmission rate is further encoded in the start frame delimiter.

29. The method according to claim 28, wherein for a 2 Mbit and a 1 Mbit data transmission rate, the preamble repeats a pattern '11110000' eight times, for a 500 kbit data transmission rate, the preamble repeats a pattern '1100101101101000' eight times, for a 250 kBit data transmission rate, the preamble repeats a pattern '11100000 01110111 10101110 01101100' eight times, and for a 125 kBit data transmission rate, the preamble repeats a pattern '11100000 01110111 10101110 01101100' sixteen times.

* * * * *